(No Model.)
M. E. STEELE.
HORSE HITCHING DEVICE.
No. 474,928. Patented May 17, 1892.
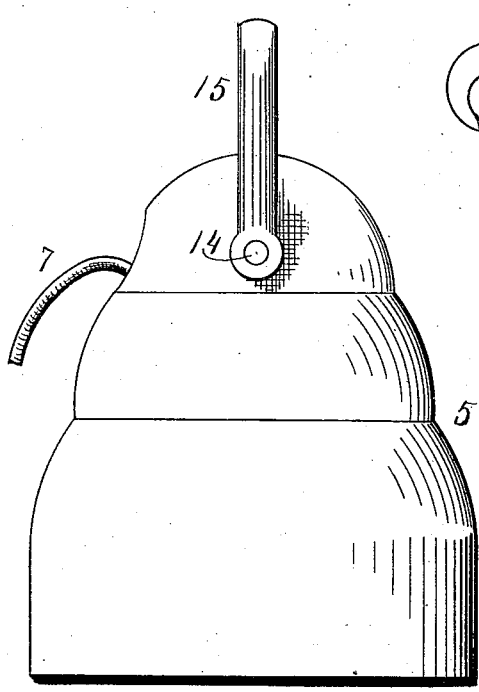
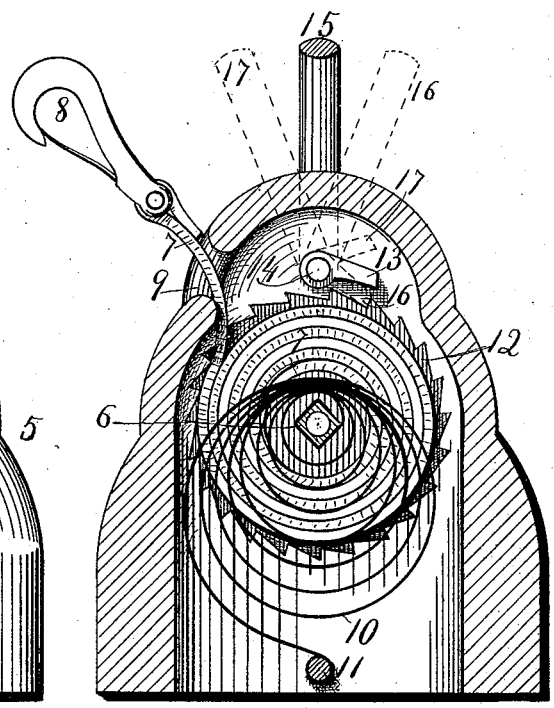
WITNESSES:
P. E. Stevens
M. C. Hillyard
INVENTOR.
Marlin E. Steele,
by W. X. Stevens, Atty.

UNITED STATES PATENT OFFICE.

MARLIN E. STEELE, OF ARGENTINE, KANSAS.

HORSE-HITCHING DEVICE.

SPECIFICATION forming part of Letters Patent No. 474,928, dated May 17, 1892.

Application filed October 12, 1891. Serial No. 408,536. (No model.)

*To all whom it may concern:*

Be it known that I, MARLIN E. STEELE, a citizen of the United States, residing at Argentine, in the county of Wyandotte and State of Kansas, have invented certain new and useful Improvements in Horse-Hitching Devices; and I do hereby declare the following to be a full, clear, and exact description of the invention, such as will enable others skilled in the art to which it appertains to make and use the same.

This invention relates to horse-hitching devices; and its object is to provide means whereby a movable weight having a strap attached thereto for hitching the horse may be provided with means for automatically winding up the strap when not in service, or for winding up any portion of the strap which is not drawn tight by the horse when hitched thereby, also, means for checking the action of the rewinding device when desired, and means for releasing this checking device by the act of picking up the weight, so that the strap will be immediately wound up when the weight is lifted by hand.

To this end my invention consists in the construction and combination of parts forming a horse-hitching device, hereinafter described and claimed, reference being had to the accompanying drawings, in which—

Figure I is a side elevation of a hitching device according to my invention, and Fig. II is a vertical section of the same.

5 represents a block of iron or other substance of sufficient weight to hold a horse when hitched thereto, and yet light enough to be raised by the hand of a person to be placed in the carriage when not in service. This block is made hollow and has journaled within it a shaft 6, upon which the hitching-strap 7 is wound, the outer end of the strap being provided with a hook 8 or other suitable means, whereby the strap may be attached to the horse's bit, the strap passing through a suitably-shaped aperture 9 in the block.

10 represents a spring coiled around the shaft 6, with one end secured thereto and the other end secured to the block, as at 11. When the strap is drawn outward, it is unwound from the shaft, thereby revolving the shaft and winding up the spring against the natural tension thereof, and when the strap is set free the spring operates the shaft to rewind the strap thereon.

12 represents the ratchet-wheel fixed upon the shaft 6 to revolve therewith, and 13 represents a detent, which is journaled in the block upon a shaft 14, the detent being adapted at its free end to engage the teeth of the ratchet-wheel to resist the action of the spring whenever it is desired to prevent the strap being rewound.

15 represents the handle of the block, firmly secured upon the shaft 14 and bearing such a relation to the detent 13 upon the shaft that it may serve as a weight to hold the detent in engagement with the ratchet-wheel when the handle is thrown over to one side, as shown in dotted lines at 16, and to hold the detent out of engagement when the handle is in a vertical position, as it would be when the weight is lifted thereby, also when the handle is allowed to fall over to one side, as shown in dotted lines 17. By this means the weight is adapted to be used either with its strap constantly drawn upon and kept tight by the spring against the action of the horse or to be set so that the strap will be retained outward at any distance to which it may be drawn. Thus this device may serve in the same manner as though the weight were hitched permanently to it without a retracting device, yet it may be used either with or without the retracting device in service, as may be found best suited to each particular horse.

Having thus fully described my invention, what I believe to be new, and desire to secure by Letters Patent, is the following:

The combination of a hollow weight, a strap secured to a shaft journaled in the weight, a spring for winding the strap, a ratchet-wheel upon the said shaft, and a detent journaled to the block to engage the ratchet and having a handle extending out of the block, adapted to swing past the center of balance either forward or backward to serve as a weight, whereby the detent may be held out of or into engagement with the said ratchet, substantially as described.

In testimony whereof I affix my signature in presence of two witnesses.

MARLIN E. STEELE.

Witnesses:
JACK OSBORN,
JOHN T. GREEN.